United States Patent [19]
Osthues et al.

[11] Patent Number: 5,132,802
[45] Date of Patent: Jul. 21, 1992

[54] HIGH CONTRAST IMAGE APPARATUS EMPLOYING OPTICAL FILTERS TO CAUSE EACH IMAGE PICK-UP ELEMENT TO HAVE ITS MAXIMUM SENSITIVITY IN A DIFFERENT SPECTRAL RANGE

[75] Inventors: Josef Osthues, Mettmann; Helmut F. Neff, Hermannsburg; Walter Meyer, Ulterlüss; Klaus Klameth, Hanover; Brigitte Nitsche, Lippstadt; Peter Haberäcker, Germering, all of Fed. Rep. of Germany

[73] Assignees: TZN Forschungs-und Entwicklungszentrum Unterlüss GmbH, Unterlüss; Rheinmetall GmbH of Düsseldorf, Düsseldorf, both of Fed. Rep. of Germany

[21] Appl. No.: 479,682

[22] Filed: Feb. 15, 1990

[30] Foreign Application Priority Data

Feb. 23, 1989 [DE] Fed. Rep. of Germany ....... 3905591

[51] Int. Cl.⁵ .................... H04N 3/14; H04N 5/335
[52] U.S. Cl. .............. 358/213.28; 358/166; 358/209; 358/225
[58] Field of Search ............. 358/209, 213.28, 226, 358/169, 166, 225, 81, 82, 113, 110

[56] References Cited

U.S. PATENT DOCUMENTS

| | | | |
|---|---|---|---|
| 4,672,439 | 6/1987 | Florence et al. | 358/226 |
| 4,794,457 | 12/1988 | Gillet et al. | 358/213.28 |
| 4,853,787 | 8/1989 | Kurth | 358/224 |
| 4,959,669 | 9/1990 | Haneda et al. | 358/80 |

FOREIGN PATENT DOCUMENTS

| | | | |
|---|---|---|---|
| 6149181 | 11/1981 | Japan | 358/213.28 |
| 59-36482 | 2/1984 | Japan | 358/213.28 |

Primary Examiner—David K. Moore
Assistant Examiner—Wendy R. Greening
Attorney, Agent, or Firm—Spencer, Frank & Schneider

[57] ABSTRACT

To obtain high contrast images of objects which are in an area covered with rich vegetation and which additionally are given a camouflage coating, the wavelength specific differences in reflection behavior of the clutter and of the camouflage coating of the object are utilized. For this purpose, the apparatus according to the invention includes at least two image pick-up elements, particularly CCD cameras, whose output signals are fed to a signal processing arrangement whereby are combined. On the side of the object, respective optical filters are disposed in front of the image pick-up elements so as to cause each image pick-up element to have its maximum sensitivity in a different spectral range.

6 Claims, 2 Drawing Sheets

HIGH CONTRAST IMAGE APPARATUS EMPLOYING OPTICAL FILTERS TO CAUSE EACH IMAGE PICK-UP ELEMENT TO HAVE ITS MAXIMUM SENSITIVITY IN A DIFFERENT SPECTRAL RANGE

REFERENCE TO RELATED APPLICATIONS

This application claims the priority of Federal Republic of Germany application Serial No. P 39 05 591.4 of Feb. 23rd, 1989, which is incorporated herein by reference.

BACKGROUND OF THE INVENTION

The present invention relates to an apparatus for producing high contrast images of objects with the aid of image pick-up elements, such as rows of sensors, sensor arrays, CCD or residual image cameras followed by a signal processing device.

Radar, infrared cameras and conventional television and movie cameras are frequently employed to detect military objects (see, for example, DE 3,631,944 and DE 3,418,394).

The use of radar for the detection of targets requires relatively high expenditures for equipment and a target which has primarily metal characteristics. The use of IR imaging devices requires a clear IR signature, i.e. a heat-radiating target. However, target detection of cold targets (shelters, stationary vehicles, etc.) is difficult.

If television and movie cameras are employed, it often occurs that unequivocal identification of military objects provided with camouflage colors or netting and surrounded by natural vegetation (clutter) is often difficult.

SUMMARY OF THE INVENTION

It is therefore an object of the present invention to provide an improved apparatus of the above-mentioned type whereby identification of appropriate objects, particularly military objects, is possible in a simple manner even if the objects are surrounded by natural vegetation and are provided with camouflage colors or camouflage netting.

The above object is generally achieved according to the present invention by an apparatus for obtaining high contrast images of an object which comprises: at least two image pick-up means for producing output signals corresponding to a common field of view; respective optical filters arranged in front of the image pick-up means on the side of an object, with each filter having a different bandpass such that each image pick-up means has its maximum sensitivity in a different spectral range; and image signal processing means, connected to receive output signals from the at least two image pick-up means, for combining the output signals from the image pick-up means to provide a composite output signal.

According to a preferred embodiment of the invention there are two image pick-up means, and the respective passbands of the filters are selected so that the radiation incident on the pick-up means is limited to first and second different wavelength ranges $\lambda_1$ and $\lambda_2$, with the first range ($\lambda_1$) being selected so that the reflection characteristics of an object and of natural vegetation (clutter) surrounding the object are as similar as possible, and with the second wavelength range being selected so that the greatest possible difference results between the reflection behavior of the object and that of the clutter. Preferably, the first and wavelength ranges are such that $0.7 \, \mu m \leq \lambda_1 \leq 2 \, \mu m$, and $0.2 \, \mu m \leq \lambda_2 \leq 0.6 \, \mu m$.

The invention is thus based on the idea of employing imaging devices, particularly inexpensive CCD (charge coupled device) cameras, which each have a sensitivity maximum in a different wavelength range. The fact that targets differ from their surrounding natural clutter with respect to their reflection behavior in the visible and near infrared range is here utilized for target detection. The resulting spectrally selective images from both cameras can thus be combined or superposed by means of relatively simple image processing so that maximum contrast is realized for the target. Due to the simple image evaluation, target detection can be realized in real time by means of standard digital signal processors.

Compared to radar or infrared target detection systems as they were frequently employed in the past, the invention disclosed here involves low expenditures for instrumentation. In particular, camouflaged positions can be detected on the basis of different reflections coming from the camouflage nets. This is not possible with other methods. Compared to conventional image processing in the visible range, the use of spectrally selective filters provides for optimum suppression of natural clutter. The result is a significantly higher detection probability.

Further details and advantages of the invention will be described below with reference to embodiments thereof and to the drawing figures.

DETAILED DESCRIPTION OF THE PREFERRED EMBODIMENTS

Figure 1:
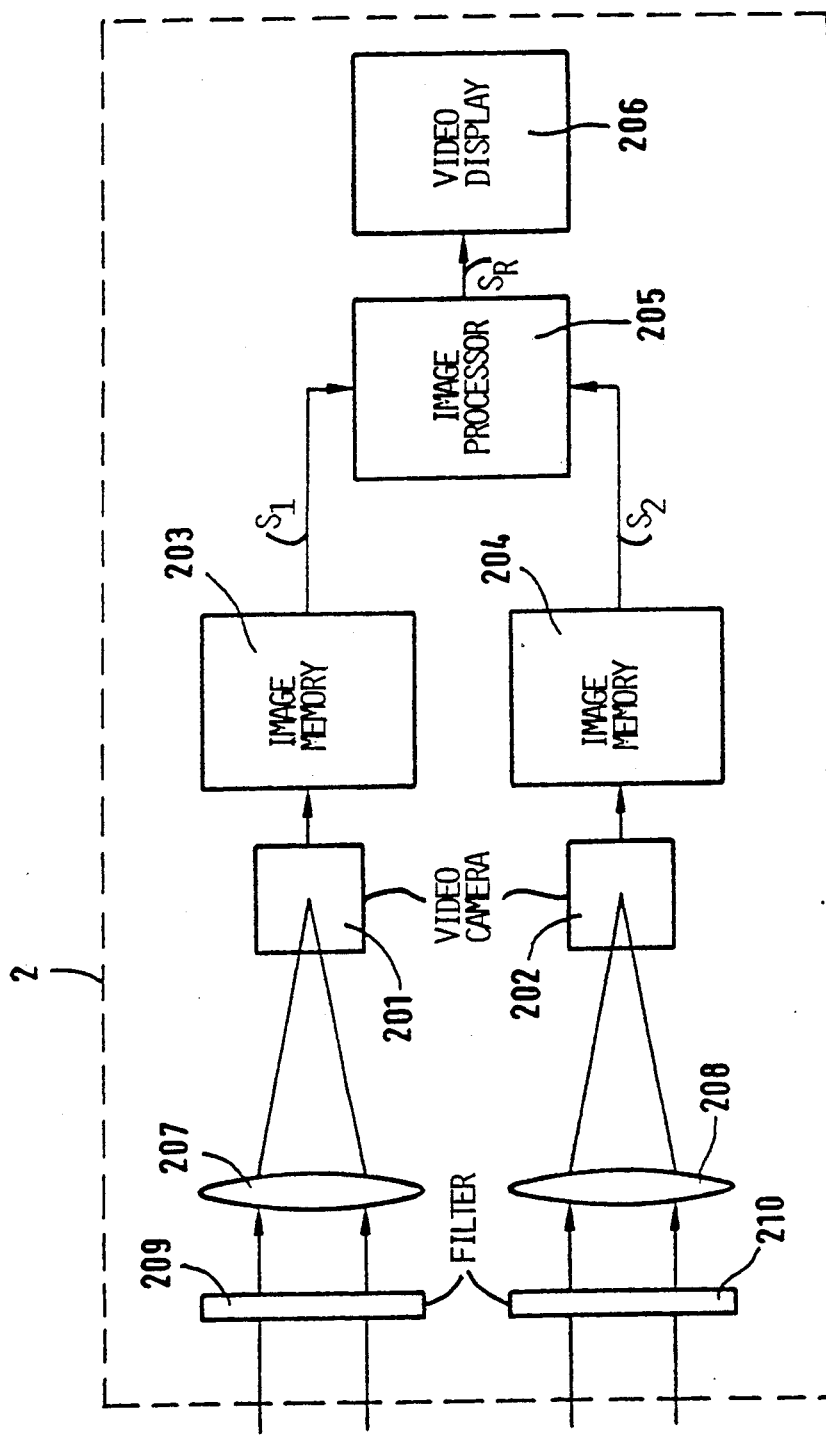
FIG. 1 is a block diagram showing a first embodiment of the apparatus according to the invention.

In FIG. 1, the reference numeral 1 identifies the target to be detected and the numeral 2 the apparatus according to the invention. Apparatus 2 includes two identical conventional CCD arrays or residual light cameras 201, 202. Both cameras 201 and 202 have the same field of view. Cameras 201, 202 are followed by respective image memories 203, 204 which are both connected with an image processor 205. The output of image processor 205 is connected to a video display 206.

On the side of the target, lenses 207 and 208 and interference filters 209 and 210 are arranged respectively in front of cameras 201 and 202.

The respective passbands of interference filters 209 and 210 cover different wavelengths. In one advantageous embodiment, filter 209 had a passband in the visible range (maximum transmissivity at 400 nm), while the passband of filter 210 is in the near infrared range (maximum transmissivity at 800 nm).

In principle, if identical CCD arrays are employed, filters 209 and 210 should be selected such that the incident radiation is limited to two different wavelength ranges $\lambda_1$ and $\lambda_2$. The first range $\lambda_1$ is selected so that the reflection characteristics of clutter and target are as similar as possible. However, the second wavelength range $\lambda_2$ is selected so that the reflection behaviors of target and clutter exhibit the greatest possible differences. Preferably, wavelength range $\lambda_1$ is selected so that it lies in the near IR range ($0.7 \, \mu m \leq \lambda_1 \leq 2 \, \mu m$)

while range $\lambda_2$ lies at wavelengths of $0.2 \mu m \leq \lambda_2 \leq 0.6 \mu m$.

The apparatus 2 according to the invention operates as follows:

The scattered light emitted by the target 1 (e.g. a combat tank surrounded by rich vegetation (clutter) and invisible to the naked eye) reaches cameras 201 and 202 through respective filters 209 and 210 and lenses 207 and 208. The respective output signals of the cameras 201 and 202 are stored in separate image memories 203 and 204, respectively. Thereafter, the stored images are combined in an image processor 205 to form output image signals $S_R$. These signals are either displayed on a video display 206 or transferred in digital form to an additional device (not shown) for further signal processing.

The algorithm structure of the processor 205 is selected, for example, so that the digitalized respective images $S_1$ and $S_2$ (in matrix form) are combined for wavelength ranges $\lambda_1$ and $\lambda_2$ by the following equations:

$$S_R = A_0 + b_1 S_1(\lambda_1) + b_2 S_2(\lambda_2)$$

where
$b_1 = b_2 = S_2(\lambda_2)^{-1}$ and
$A_0 = $ a constant to be determined.

Another possibility for producing a resulting image signal $S_R$ in the processor 205 is to effect the linkage of the partial image signals $S_1(\lambda_1)$ and $S_2(\lambda_2)$ with the aid of the known multiple linear regression method.

Figure 2:
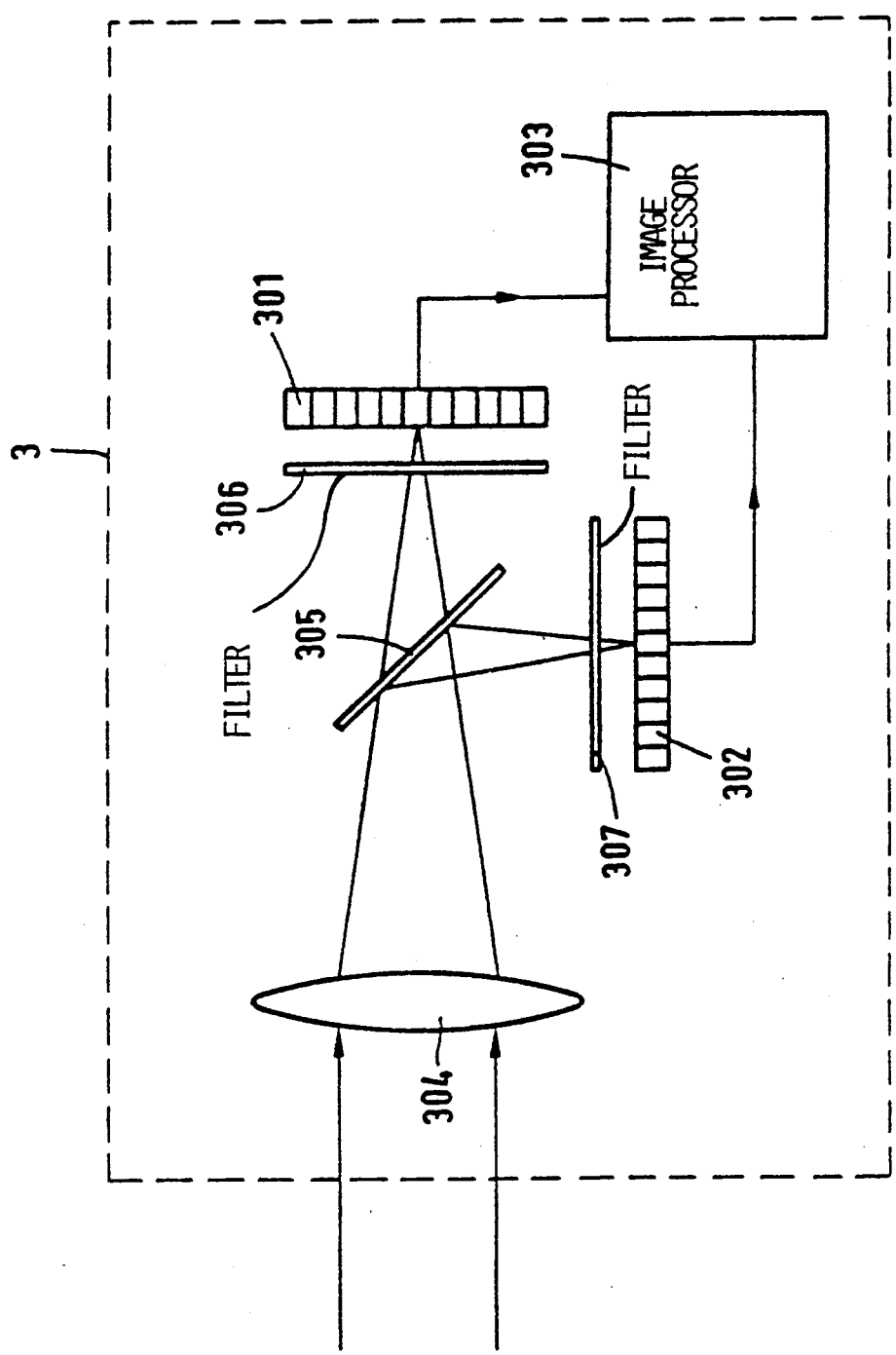
FIG. 2 is a block diagram showing a second embodiment of the invention.

FIG. 2 shows a further embodiment of the apparatus according to the invention. This apparatus is given the reference numeral 3 and is again composed essentially of CCD arrays 301 and 302 which are connected with a signal processing device including a screen or video display 303.

In contrast to FIG. 1, apparatus 3 includes only one lens 304 and an optical beam divider 305. Interference filters 306 and 307 (which have passbands corresponding to those of filter 209, 210 of FIG. 1) are disposed directly in front of arrays 301 and 302, respectively. In this embodiment, the reflected light beams from target 1 are thus conducted through lens 304 to the beam divider 305, and then via the respective interference filters 306 and 307 to the arrays 301 and 302. The output signals of arrays 301 and 302 then reach signal processing device 303, are there processed into corresponding image signals and are displayed in a manner similar to that described with regard to FIG. 1.

Instead of a direct pictorial display on a monitor, image signals $S_R$ may also be employed digitally by a further signal processor (not shown) for further target classification and target tracking, for example, for autonomous projectiles or guided missiles.

The invention now being fully described, it will be apparent to one of ordinary skill in the art that any changes and modifications can be made thereto without departing from the spirit or scope of the invention as set forth herein.

What is claimed is:

1. An apparatus for obtaining high contrast images of an object comprising: first and second image pick-up means for providing output signals corresponding to a common field of view; respective optical filters arranged in front of each said image pick-up means on the side of an object, with each said filter having a different passband such that each said image pick-up means has its maximum sensitivity in a different spectral range; and image signal processing means, connected to receive said output signals from said first and second image pick-up means, for combining said output signals to provide a composite output signal; and wherein the respective passbands of said filters are selected so that the radiation incident on said first and second pick-up means is limited to first and second different wavelength ranges $\lambda_1$ and $\lambda_2$, with said first range ($\lambda_1$) being selected so that the reflection characteristics of an object and of natural vegetation (clutter) surrounding the object are as similar as possible, and with said second wavelength range being selected so that the greatest possible difference results between the reflection behavior of the object and that of the natural vegetation.

2. An apparatus as defined in claim 1, wherein the following applies for said first and second wavelength ranges:

$$0.7 \mu m \leq \lambda_1 \leq 2 \mu m \text{ and}$$

$$0.2 \mu m \leq \lambda_2 \leq 0.6 \mu m.$$

3. An apparatus as defined in claim 1 wherein said optical filters are interference filters.

4. An apparatus as defined in claim 1 further comprising respective lenses disposed between each of said image pick-up means and its associated one of said filters.

5. An apparatus as defined in claim 4 further comprising a respective image memory connected between the output of each of said image pick-up means and a respective input of said processing means.

6. An apparatus as defined in claim 1 and further comprising a single lens for focussing the light from an object, and a beam divider means, disposed in the path of the focussed light between said lens and each of said filters, for directing the focussed light onto each of said first and second image pick-up means.

* * * * *